United States Patent [19]
Paul et al.

[11] 3,912,279
[45] Oct. 14, 1975

[54] OPERATING PROGRAM CONTROL FOR A RECORD PLAYBACK DEVICE

[75] Inventors: Bruno Paul; Jurgen Wilisch; Rainer Ihlenburg, all of Berlin, Germany

[73] Assignee: TED Bildplatten Aktiengesellschaft, AEG-Telefunken-Teldec, Zug, Switzerland

[22] Filed: Aug. 14, 1974

[21] Appl. No.: 497,386

[30] Foreign Application Priority Data

Aug. 14, 1973 Germany............................ 2341034
Aug. 14, 1973 Germany............................ 7329657

[52] U.S. Cl................................. 274/10 R; 360/86
[51] Int. Cl.$^2$....................G11B 17/10; G11B 17/04; G11B 5/82
[58] Field of Search...... 360/86, 91, 133; 274/10 R, 274/39 A

[56] References Cited

UNITED STATES PATENTS

| | | | |
|---|---|---|---|
| 2,339,981 | 1/1944 | Cranmer et al. | 274/10 R |
| 3,789,160 | 1/1974 | Bruer et al. | 360/86 |
| 3,836,731 | 9/1974 | Wilisch et al. | 360/86 |

*Primary Examiner*—Harry N. Haroian
*Attorney, Agent, or Firm*—Spencer & Kaye

[57] ABSTRACT

A program control disc for a record changer for video discs or phonograph records, provided with at least one program control portion which can be disconnected from the control disc drive and stopped if certain portions of the overall operating program are to be suppressed.

6 Claims, 9 Drawing Figures

OPERATING PROGRAM CONTROL FOR A RECORD PLAYBACK DEVICE

BACKGROUND OF THE INVENTION

The present invention relates to an operating program control unit for a record playback device, particularly for a phonograph or video record changer, of the type including a control disc which serves to control a sequence of program functions, such as, for example, the various operating steps required to play back a number of phonograph or video records in an automatic changer operation.

In such phonograph or video record changers it is often desired to vary the program sequence established for the various operating steps by a program control disc, hereinafter called "control disc". This is the case, for example, if it is desired to operate the changer mainly for automatic playback without record changing. In this case only the movements of the pickup arm need be controlled while the operation of the changing mechanism must be suppressed.

For effecting such an operation, it is known to disconnect the record changing mechanism of the record changer by means of a suitable actuating mechanism via a coupling. It is also known to provide switches on the program control disc which, in conjunction with sensor elements which are in engagement with the program control disc, follow two different paths on the control disc in dependence on the desired program sequence.

The known devices have the drawback, however, that they permit a variation with regard to only a few functions within the program sequence. There is also the danger that, if the change in program is effected by switches, soiling of the control surfaces causes the sensor to take up an erroneous path causing the device to operate improperly.

SUMMARY OF THE INVENTION

It is therefore an object of the present invention to provide a program control disc for a phonograph or video record changer with which it is possible to vary even complex program sequences and which is operationally dependable and can be produced easily and economically.

These and other objects according to the invention are achieved by arranging the program control disc to have at least one program control portion which can be disconnected from its drive system when the operations controlled by that portion are to be suppressed.

Particular advantages of the present invention are the space saving arrangement of the control mechanism for relatively complicated program sequences and the ease with which such mechanism can be installed.

Further advantageous features of the invention will be descrived in detail below.

DESCRIPTION OF THE PREFERRED EMBODIMENTS

Figures 1, 2, 3:
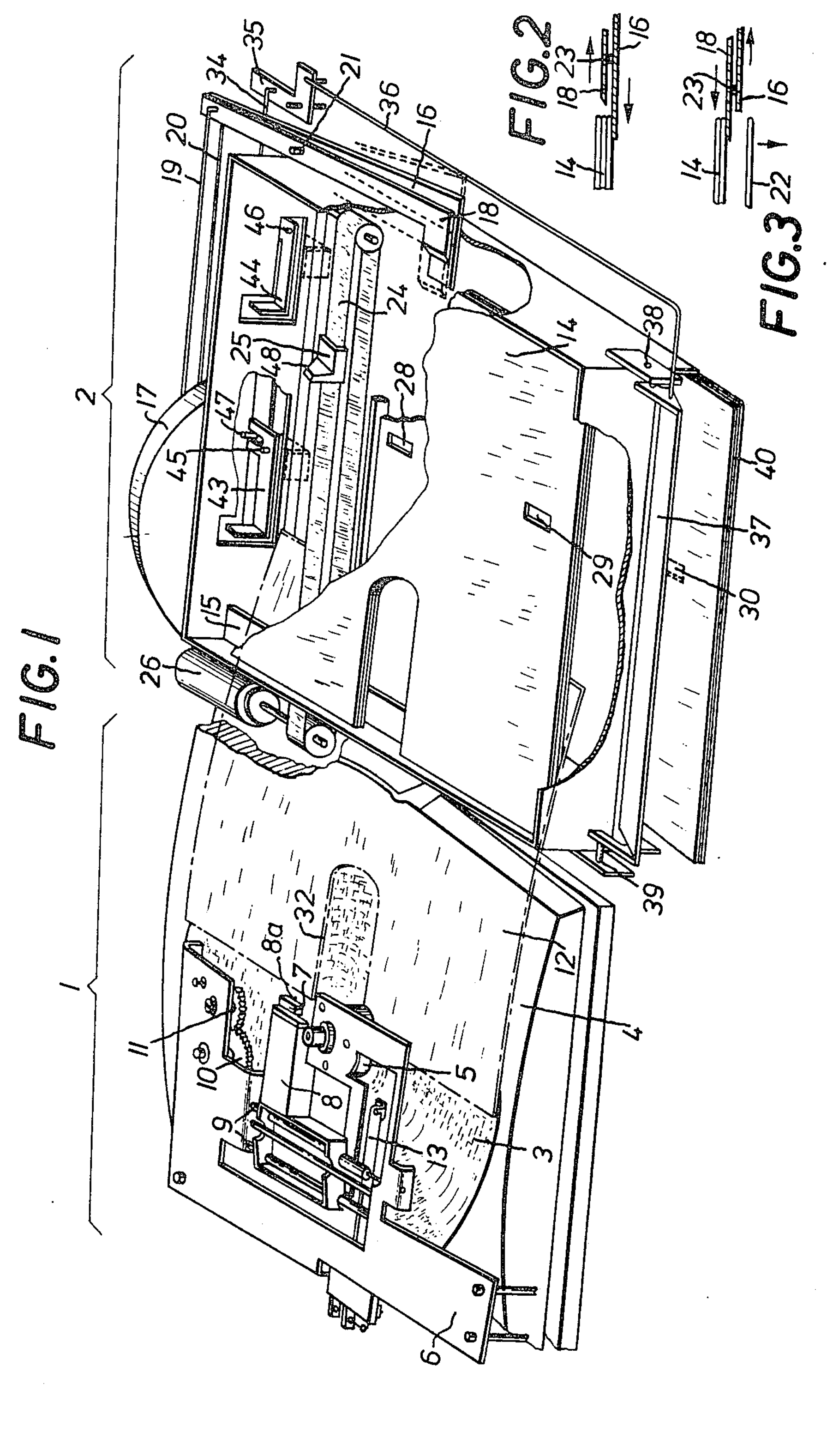
FIG. 1 is a perspective view of a playback device whose operational sequence is influenced by the control disc of the present invention.
FIG. 2 is a sectional detail view of a component of the playback device shown in FIG. 1.
FIG. 3 is a view similar to that of FIG. 2 showing the same component at a later stage in the course of a record changing process.

The playback device shown in FIG. 1 is constructed for the playback of flexible record carrier foil discs which rotate at high speed while supported on an air cushion above a stationary playback surface. The air cushion is composed of air which is caused to flow radially from the region of the center of the disc by the rotation of the disc and this flowing air causes the disc to tend to lie parallel to the playback surface. The playback surface is preferably curved to impart a corresponding stiffening curvature to the disc. The apparatus essentially includes a playback portion 1 for the record carriers and a storage portion 2 where record carriers are held inside protective covers in readiness for introduction into the playback portion and to which they are removed after completion of playback.

Figure 4:
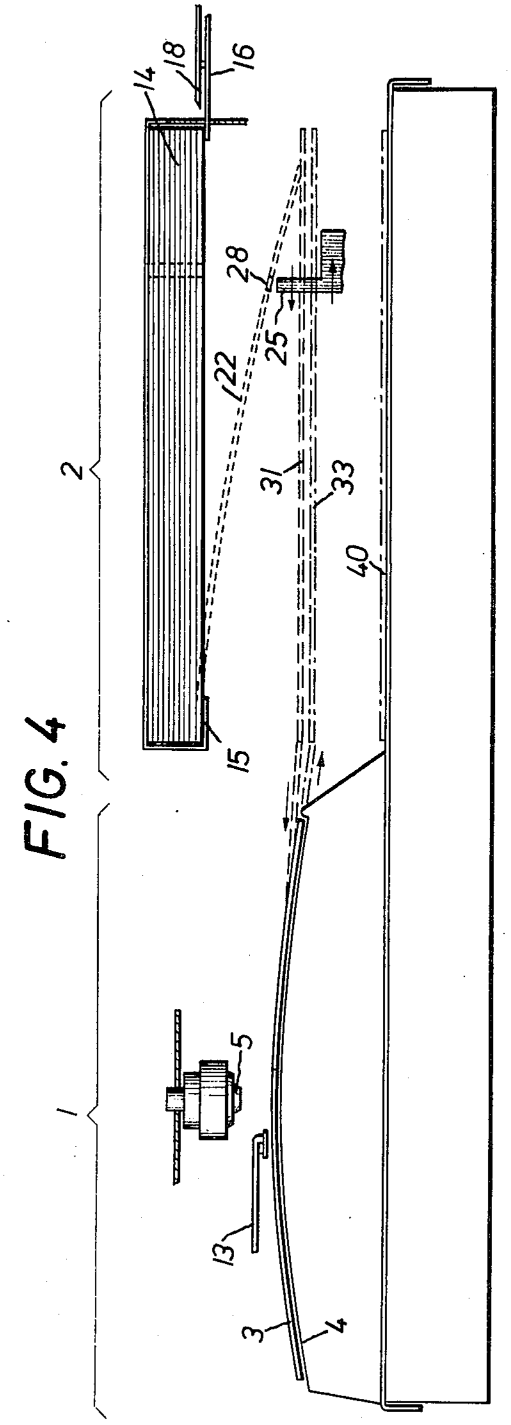
FIG. 4 is a simiplified side elevational view of the playback device shown in FIG. 1.

The playback portion 1 constitutes a known video disc player in which a record carrier foil 3 rotates on a cushion of air above a stationary, curved surface 4. The rotating record carrier 3 is driven via a liftable first positioning member 5 which is rotatably mounted in a carrier portion 6 and which carries a frustoconical portion at it slower end, as seen in FIG. 4, that engages in the center hole of record carrier 3. The drive motor itself is disposed below surface 4 and cannot be seen in the drawing. A holder 7, which is to be positively driven across the foil 3 and which carries a pickup 8*a* for the signals stored in grooves on the record carrier, is connected with a carriage 8 which itself is displaceably mounted on guides 9. Carriage 8 is advanced, during playback, at constant speed in a radial direction across the record carrier 3, the drive of carriage 8 being effected via toothed wheels 10 and 11.

Delivery of a record carrier to the playback portion 1 is effected by bringing the record 3, while still in its protective cover 12, into its playback position on the saddle-shaped surface 4. During this operating phase, positioning member 5 is in a raised position.

In order to make the recording disposed on the upper side of the record 3 accessible to pickup 8*a*, the protective cover 12 must be removed from the playback portion 1, prior to the playback process, while record 3 itself remains positioned on the saddle plate 4. This can be achieved by lowering positioning member 5 onto a turntable 125, shown in FIG. 7, located in an opening in surface 4 so that the record carrier is gripped between member 5 and the turntable.

Since, however, it is intended to accelerate the record changing porcess, the turntable preferably continues to rotate during the introduction and removal of the record so that time consuming braking and renewed starting up of the drive with the associated rotating masses is avoided. Therefore, such lowering of the positioning member 5 would operatively couple the record 3 to the drive while the record is still contained in the protective cover. Since, because of the high rotating speed of the record, of the order of 1500 rpm, during playback, such a state is untenable, an additional holding finger 13 is provided which holds the record 3 on surface 4 against the tendency to be carried along during retraction of the protective cover due to the action of frictional forces.

This holding finger 13 is located to engage a part of the record surface which does not bear any recording. If the protective cover 12 is not provided with a recess 32 extending from the center up to the edge, the holding finger 13 may alternatively be disposed at the outer edge of surface 4.

The holding finger 13 simultaneously serves to brake the record upon completion of a playback process after positioning member 5 has been slightly raised and while the turntable in surface 4 continues to rotate. At the start of playback, positioning member 5 is lowered so that the record is coupled to the drive and begins to rotate at the required speed. The holder 7 with the pickup 8*a* is at this time also lowered and begins to follow the spiral groove containing the recording, starting from the outer periphery of the record. Carriage 8 of the pickup is driven at a uniform speed for records which have grooves with a constant pitch.

Whereas the above-described playback portion 1 can be used for video playback devices of various types, the present invention is directed mainly to the storage portion which serves to hold the records, preparatory to playback, together with their protective covers, as well as to hold the protective cover of the record currently being played and to move a record which has just been played, with its protective cover, into a removal position. The storage portion also contain mechanisms for transporting each record carrier to the playback portion 1.

Due to the fact that a record is removed from its protective cover only during the time when it is being played, whereas storage and separation for introduction into the playback part are effected with the record inside the cover, it is assured that the sensitive portions of the record surface are substantially protected. The insertion of the record into, and removal of the record from, the protective cover are processes which require additional time during the changing process. In the interest of the user of such a playback device it is desirable, however, to make the record changing times as short as possible in order to prevent the intervals between the performances, or breaks in a continuous performance, from becoming unnecessarily long. The resulting change times should be approximately of the order of magnitude of the change times resulting in a phonograph changer where it is merely required to retract the tone arm, drop a record and replace the tone arm.

The embodiment illustrated is designed to optimally utilize the short change periods made possible by the method to be described below.

By placing the storage portion 2 closely adjacent the playback portion it is possible to move the record directly onto surface 4 from the side. The time required to change records is shortened in that the holder 7 with pickup 8*a* can be returned to its starting position during the removal of introduction of the record so that pickup will be in the proper position when the new record arrives. In contradistinction to the conventional record changers in which the tone arm must be laterally pivoted out during the dropping of the next following record, resetting of the tone arm and record changing can take place simultaneously in the present playback device.

As is best seen in FIG. 4, the upper portion of storage portion 2 accommodates a stack 14 of protective covers in which the records are being held in readiness for successive playback. The next following record to be played is always in the lowermost protective cover in the stack and this cover is removed from the stack for the playback process and is not returned thereto. The played records together with their protective covers are moved in succession to a removal position. This makes it possible to place additional records in their covers into the playback device during the playing of one record and to remove the played records from the playback device so that it is possible to operate the device practically endlessly.

One edge of the stack 14 rests on a contact ledge 15 while the opposite edge of the stack is normally supported by a contact member 16 of a separating device which will be described in detail, with reference to FIGS. 2 to 5.

The entire changer mechanism for the playback device is influenced by a control disc 17 according to the present invention which is shown schematically in FIG. 1 and in detail in FIGS. 6 and 7 and whose function will be described in detail below. Control discs which, via rocker arms and cams, actuate in succession certain preprogrammed functions in the course of their rotation are known in connection with conventional phonograph record changers. The movement of the contact member 16 and an associated blade member 18 are controlled by suitable rocker arms associated with control disc 17 via respective connecting rods 19 and 20. The contact member 16 and the blade member 18 are pivotally mounted at point 21. As can be seen in FIGS. 2 and 3, contact member 16 and blade member 18 always move in respectively opposite directions.

In order to separate the lowermost record in stack 14 together with its protective cover 22, i.e. to remove it from the stack, blade member 18, which is spaced above contact member 16 by a distance which corresponds to the thickness of a protective cover, is inserted into the stack in such a manner that the lowermost protective cover 22 is separated from the rest of the stack. A shim 23 attached to blade member 18 serves as a spacer between contact member 16 and blade member 18.

When blade member 18 has gripped the rest of the stack and is holding it in its respective position, contact member 16 is retracted, as shown by the associated arrow in FIG. 2, so that the lowermost protective cover drops into an enabling position, shown in FIG. 4, in the area where it faces the separating device. Its opposite edge continues to rest on contact ledge 15.

This separating device, which penetrates into the stack 14 of protective covers containing the records only from one side, is particularly favorable because, in this way, blade member 18 grips the protective covers at one of their closed sides. In contrast, access at the open side of the covers could only lead to malfunctions if blade member 18 should enter between the panels of a protective cover. Furthermore the record inside the cover might be damaged.

A plurality of oppositely disposed separating devices along the longitudinal sides of the protective covers would also not be as favorable because, if they are disposed on both sides, they require more space, increase the structural size of the playback device and impede lateral insertion or lateral removal of the protective cover with the records.

After separation, the lowermost protective cover 22 of the stack is in the enabling position shown in FIG. 4. It is thus within the access range of a second positioning member, gripper 25 carried by an endless belt 24. A drive motor 26 for belt 24 now moves belt 24, upon actuation by a contact on control disc 17, so that gripper 25 will engage in a recess 28 provided for this purpose in protective cover 22. This recess is shown in FIG. 4 in dashed lines and corresponds to recesses 28 to 30 in FIG. 1.*)

*) These recesses are positioned near both of the edges of the record covers. Only the recesses situated near gripper 25 are in use with the playback device describe here. Gripper 25 is first driven in such a direction that the protective cover 22 is pulled out of its enabling position in which its forward edge still rests on contact ledge 15 and drops into a position 31 which is parallel to its original position in stack 14, as shown in dashed lines in FIG. 4. Belt 24 with gripper 25, as will be describe below, serves substantially to introduce the record carrier into playback portion 1. The simple structure of the separating device is possible, inter alia, particularly because gripper 25 also participates in the separating process, as just described.

The protective cover, together with the record which now is to be introduced into the playback portion so that it can be played, is then brought into a position in which the record can be gripped and removed from the protective cover. For this it is not necessary for the protective cover together with the record to be completely moved into the playback position for the record in playback portion 1 — as shown in the illustrated embodiment — it would rather suffice to guide the record in the cover only to the point where it can be gripped by suitable transporting means (rollers or the like) which subsequently would move it completely to surface 4.

In the illustrated embodiment the protective cover is moved by gripper 25 from the position 31 shown in dashed lines in FIG. 4 completely onto surface 4, gripper 25 being driven by drive motor 26 in the opposite direction with respect to the driving direction required to pull the cover 22 into the enabling position. The cover 12 is introduced into the playback portion 1 of the playback device with its open portion in the lead, the cover being guided by mechanical means in the horizontal and vertical directions so that the record reaches a position which is parallel to surface 4. As already described, holding finger 13 is now actuated to grip record 3 at an insensitive area of its surface, preferably in the region of recess 32 in protective cover 12, and hold it in the playback position. Upon reversal of the driving direction of gripper 25, the protective cover is retracted from the playback portion 1 of the playback device and holding finger 13 passes through recess 32 in the protective cover 12.

By coupling the record carrier to the rotating turntable by means of positioning member 5 the record is caused to rotate at the speed required to play back the signals recorded thereon.

One suitable arrangement for bringing the record and its cover to the playback position and holding the record while the cover is removed is disclosed in copending, commonly assigned Dannert et al. application Ser. No. 474,448 filed on May 28th, 1974 as a division of application Ser. No. 284,173, filed Aug. 28th, 1972 and now abandoned.

The protective cover from which the record being played has been removed, is returned into a waiting position 33 in storaage portion 2 where it remains for the time the record is being played.

The waiting position 33 is substantially the same as position 31, because in both positions the record cover 12 is supported by belt 24 and ledge 37. The positions 31 and 33 are spaced vertically from one another in FIG. 4 for the sake of clearness as the movement of the record cover 12 is concerned.

Upon completion of playback of the record 3 in playback portion 1 a special end signal recorded on the record is actuated. As soon as this end signal is scanned it is electronically evaluated and then positioning member 5 is lifted by a small amount so that the record will no longer be operatively connected with the turntable but is still centered in its playback position by the frustoconical portion of member 5. Then the holding finger 13 is lowered so that the record is braked and stops rotating. Upon further rotation of control disc 17, which had been stopped during the playback process, the protective cover in its waiting position 33 is again brought — with its opening in the lead — to surface 4 of the playback portion 1. This drive is again effected by gripper 25 on belt 24 which is activated in a known manner by control disc 17 — for example through an electrical contact, as will be described below. The edges at the open sides of protective cover 12 are spread open by mechanical means when a surface 4 has been reached so that the protective cover is pushed over the played record. This can be achieved in a manner also described in the above-cited application. The holding finger 13 is raised during this time.

Figure 5:
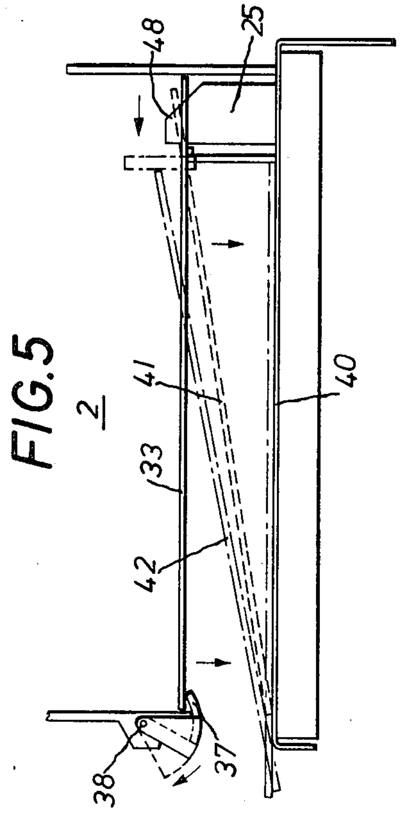
FIG. 5 is a simplified end view of the playback device shown in FIG. 1, in the direction toward the record carrier storage portion thereof.

If in this way the record has been completely pushed into protective cover 12, positioning member 5 is raised completely and the direction of rotation of drive motor 26 is reversed. This moves the record 3 together with its protective cover 12 back to the waiting position 33. But it does not remain in this position since a second, movable, contact ledge 37, shown in FIGS. 1, 5 and 7, is simultaneously pivoted out of the way via a further control cam in control disc 17, a suitable guide element, (not shown) and connecting members 34, 35 and 36, this contact ledge 37 being pivotally mounted on pins 38 and 39. The contact ledge 37, on which the protective cover in waiting position 33 is supported, then moves out of the contact region of the portective cover so that the cover drops downwardly in the region of the edge which had thus far been resting on the movable contact ledge 37, to position 41 shown in FIG. 5.

But this is not yet the removal position 40 shown in FIGS. 1, 4 and 5 since the opposite lateral edge of the cover with the corresponding recess is still in engagement with gripper 25. Thus it is not as yet possible to remove the protective cover with the record from the playback device, and on the other hand the transporting device, including belt 24 and gripper 25 is not yet free for introducing a further record into playback portion 1.

Figures 7B, 7C:
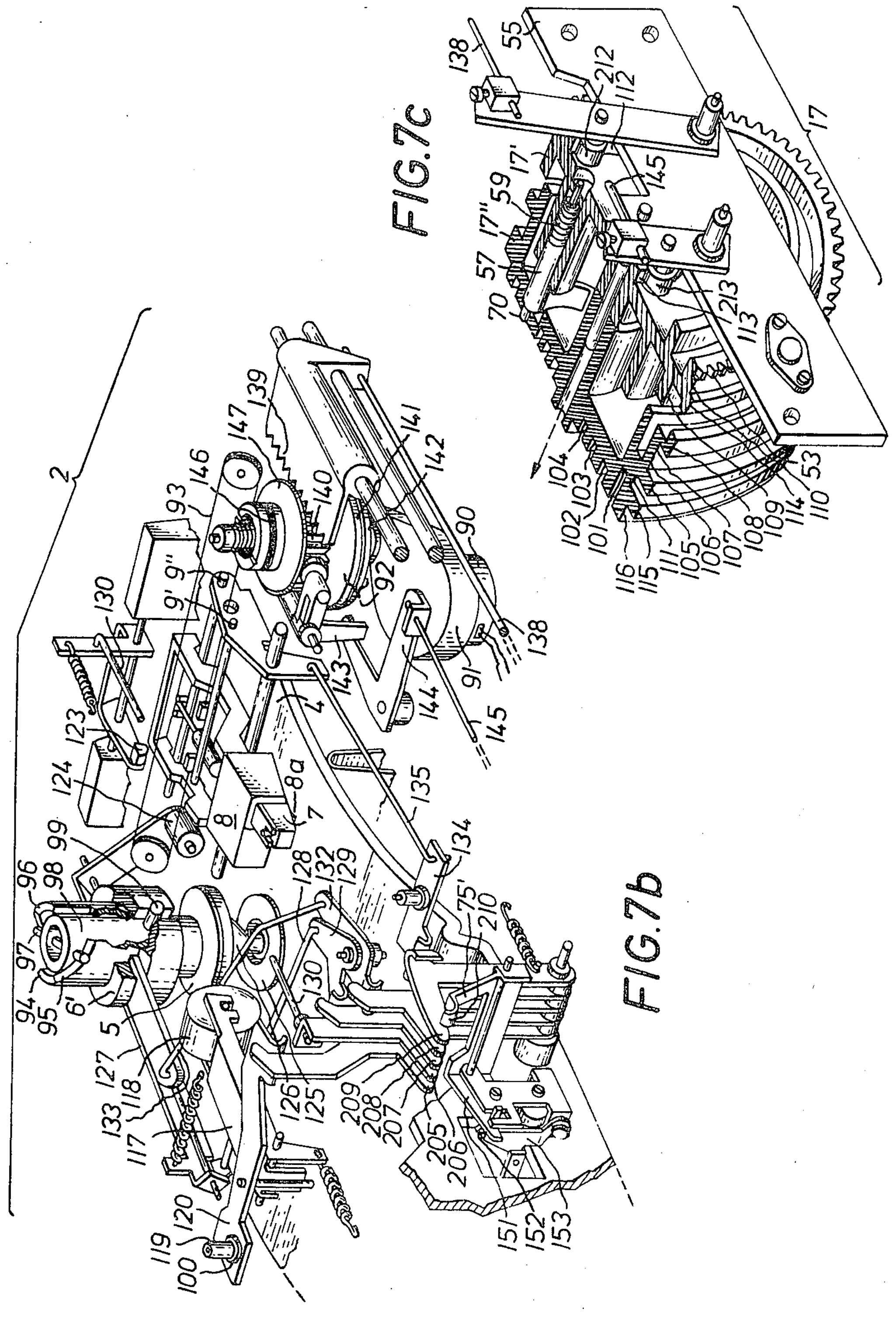
FIG. 7 consisting of FIGS. 7*a* to *c* is a perspective view partly in cross section and partly exploded, with certain housing portions removed, showing the control disc (FIG. 7*c*) and operating mechanisms of the embodiment illustrated in FIG. 1 (FIG. 7*a* and *b*).
Figure 7A:
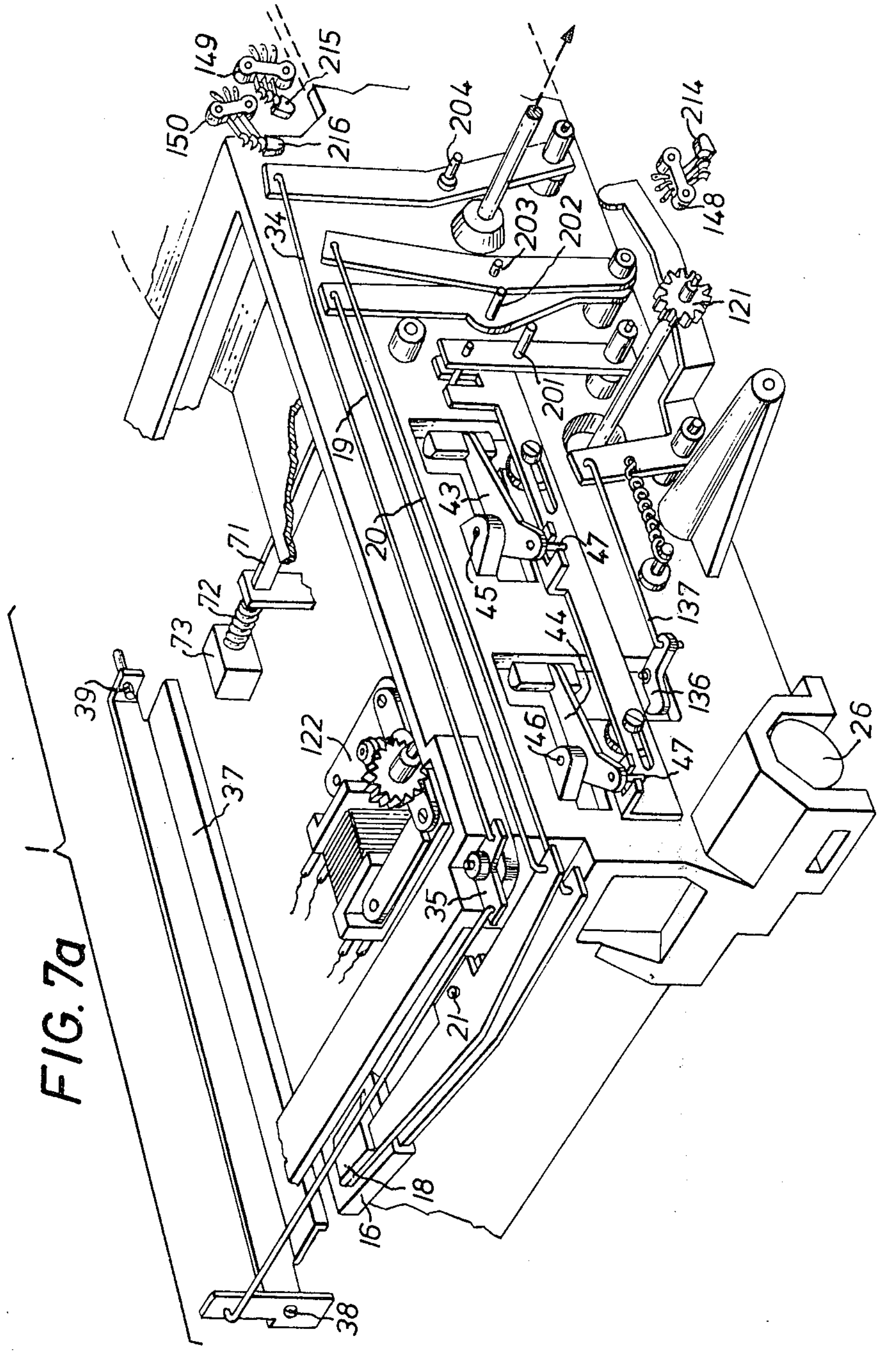

Therefore, pushers 43 and 44 are provided and are pivotally mounted at 45 and 46, respectively, as shown in FIGS. 1 and 7. With a further corresponding control cam on control disc 17 these pushers are activated and pivoted in by suitable actuation means. Thus the protective cover resting on belt 24 is pushed away from the belt, as shown in FIG. 5, in the direction of the arrow from position 41 to position 42. In order for gripper 25 not to interfere with this transporting process, its rear edge 48, relative to the protective cover withdrawal direction, is sloped. In this way the closed recess 28 will automatically release itself from gripper 25 when pushers 43 and 44 are actuated. The protective cover is thus freed from belt 24 and the region of that edge which previously had been resting on belt 24 drops so that the cover reaches the withdrawal position 40. In this position the protective cover with the played record can remain until it is removed from the front of the playback device.

This need not be done directly after playing of each record, but rather a stack of played records can be built up until the space provided for this purpose has been filled.

In order to complete the automatic record changing, the lowermost record in stack 14 in its protective cover is now introduced, into playback portion 1, as described above. The pickup 8*a* in mount 7 is reset in the meantime so that play can begin immediately when the next following record is in the playback position.

Figure 6:
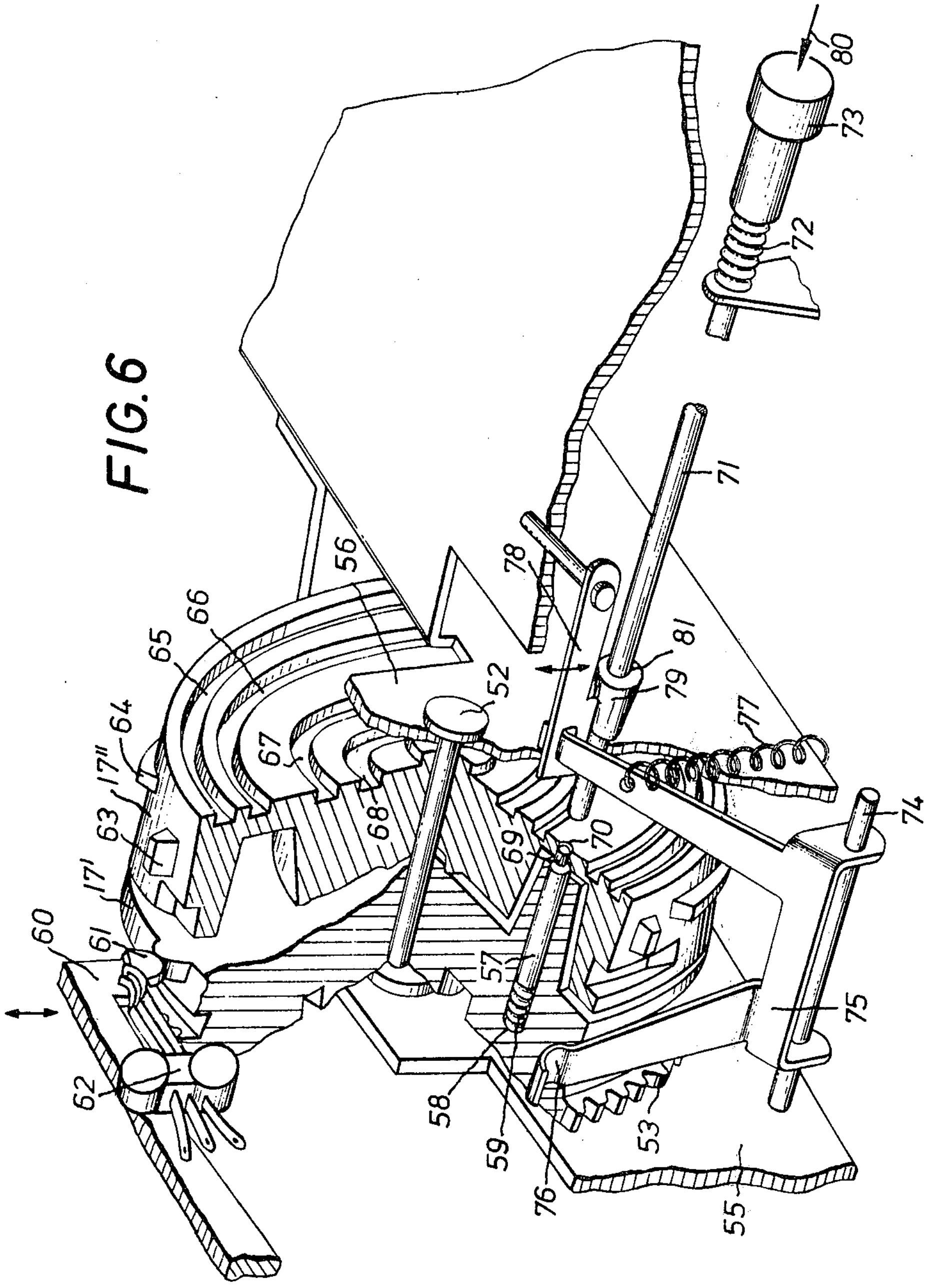
FIG. 6 is a perspective detail view, partly in cross section, of the control disc of the embodiment shown in FIG. 1.

Referring now to FIGS. 6 and 7, the program control disc 17 shown generally in FIG. 1, includes a driven part 17′ which is rotatably mounted on a shaft 52 and which is caused to rotate by engagement of teeth 53 with drive means, such as a pinion 121, shown in FIG. 7, for example. Also on the shaft 52 is a disconnectable part 17″ of the program control disc. Both parts are secured against axial displacement by wall portions 55 and 56.

For the complete sequence of all program portions the two parts 17′ and 17″ of the program control disc are operatively connected together by means of a follower pin 57 which is inserted into a blind bore 58 in the driven part 17′ of the program control disc. During rotation of the program control disc, sensor elements 60 and 61, which are shown here only in exemplary form, are actuated, if required, repeatedly. Thus mechanical or electrical functions can be initiated, for example by sensor element 61 which is connected with a microswitch 62.

The disconnectable part 17″ of the program control disc also controls a number of functions by means of cams 63 and 64 as well as control cams 65, 66, 67 and 68 and associated sensor elements which are not shown in FIG. 6. The control disc drive as well as the control of the individual functions of a video record changer will now be described in detail.

If, for a given position of the program control disc, the follower pin 57 is disengaged from the disconnectable part 17″, the latter stops rotating and during the next revolution of the driven part 17′ of the program control disc only those functions are actuated for which sensor elements are in engagement with the driven part 17′ of the program control disc. The contact pressure of pressure spring 59 causes the follower pin to be automatically engaged again upon completion of this revolution of the program control disc so that during the next revolution of the program control disc the complete program will again be played through. A protrusion 69 on the follower pin 57 here prevents the latter from penetrating more deeply than desired into bore 70 of the disconnectable part 17″.

Disengagement of follower pin 57 is effected by an actuating pin 71 which is operated from outside the instrument by means of a pressure key 73 resiliently supported by a compression spring 72. The actuating pin 71 engages in the bore 70 of part 17″ of the program control disc 17 and thus presses the follower pin 57 into the blind bore 58 until the pin 57 and protrusion 69 are just completely inside the driven part 17′. When part 17′ of the control disc is now rotated further, part 17″ is held stationary since the connection provided by follower pin 57 no longer exists. Any effects as a result of lifting tolerances of the actuating pin 71 which could prevent separation of parts 17′ and 17″ of program control disc 17 are avoided by a rounding of the facing ends of follower pin 57, 69 and actuating pin 71 or by a corresponding overtravel with sufficient spacing between the two parts 17′ and 17″ of the control disc. Due to the fact that actuating pin 71 engages in a recess, here bore 70, of the disconnectable part 17″ of the program control disc 17 and thus blocks the disc against rotation, the disc is safely prevented from being further carried along by driven part 17′ as a result of frictional forces. After one complete rotation of part 17′, follower pin 57 jumps back into bore 70 of part 17″, assuming key 73 has been released and pin 71 has returned to its retracted position.

In order to assure that the actuating pin 71 can engage only in a given position of the driven part 17″ of the program control disc, so that the suppressable program portions will not be switched off at a wrong time within the program sequence, a lever 75 is provided and is pivotally mounted on a shaft 74. Lever 75 is also provided with a sensor element 76 in engagement with driven part 17′ of the program control disc 17. Lever 75 is arranged to raise a blocking latch 78, against the force of a tension spring 77, only when the driven part 17′ is in a certain given angular position, to permit passage of a sleeve 79 fixed on actuating pin 71 in the direction of arrow 80.

The sleeve 79 is conically widened in a direction opposite to the direction of arrow 80. Thus, after pin 71 engages in bore 70, the end of latch 78 which faces disc 17 engages at a leading edge 81 of the sleeve and keeps pressure key 73 in its depressed position, to visibly indicate a change in the program sequence, until, toward the end of the program, release of latch 78 by means of an appropriate cam on part 17′ of the control disc releases the sleeve so that pin 71 will return to its original position with the aid of pressure spring 72 and will be ready for renewed actuation.

FIG. 7 shows in detail how the functions of the already described playback device are initiated or controlled for foil-shaped record carriers by various actuating elements via control disc 17 which is shown in an exploded manner. The various sensors and cam followers are here shown in detail. The carriage 8 for pickup 8a is driven on guides 9′ and 9″ by means of a motor 90 and gears 91 via a disengageable clutch 92 and a pully drive 93. The disengageable clutch 92 is used to quickly change the position of the riased pickup, particularly to reset it. Lifting of the first positioning member 5 is therefore effected within a fixed carrier portion 6′ via a rotatable part 94 which is provided with two oblique planes 95 and 96, on which slides a pin 97 of a lifting part 98 which rotatably holds positioning member 5. The lifting part 98 itself is secured against rotation by pin 99. Part 94 is rotated by a pivot arm connected thereto, via a lever 132 and actuating rod 133.

A roller 118, which is rotatably held in a mount 117 that is itself pivotal about axis 100 serves to better guide the protective covers on surface 4. For this purpose, whenever a protective cover is brought to surface 4, roller 118 is lowered by means of a lever 120 pivotal about a fulcrum 119. As lever 120 pivots, a vertical pin carried thereby moves to release mount 117 to enable roller 118 to be moved downward under the influence of a tension spring connected to the mount.

In contradistinction to the playback device shown in FIG. 1, the function of the holding finger 13 shown there is here taken over by two separate components. The record carrier is held in the playback position on surface 4 by a holding finger 123 which is actuated by means of a rod 130 and which grips the record carrier not, in the manner of holding finger 13 of FIG. 1, in its inner region, but in its outer region where no recording is present. The recess in the protective cover required for this purpose then need not extend to the center of the cover as for a centrally disposed holding finger.

However, it is then necessary to brake the protective cover by means of an additional component, here a braking roller 124 which is mounted on a pivotal support part 127 and is actuated via a rod 128 and a bell crank lever 129. The braking roller 124 is activated if upon completion of playbck, with the record carrier turntable 125 continuing to rotate, the positioning member has been raised slightly and the record carrier which has been centered by means of the frustoconical protrusion 126 on member 5 to be quickly braked in order to accelerate the changing process.

During changing of records, the pickup 8*a* is raised in a pivoting movement about guide 9″, which is stationary, via lever 134 and rod 135.

A contact hook 136, which is actuated via a rod 137, provides a defined starting position for the gripper 25 and belt 24 (shown only in FIG. 1) before each changing process.

Belt 24 is driven by drive motor 26′ corresponding to motor 26 of FIG. 1. The motor is switched on, during the time in which gripper 25 is to move, by control cam 115 and sensor element 215 and microswitch 149. A change in the direction of rotation of motor 26′ is effected via control cam 116, guide element 216 and microswitch 150.

Return of pickup 8*a* to the outer edge of the disc, during the changing process and while the pickup is raised, is controlled by a sensor element 212 rotatably mounted on a lever whose movement is transmitted via rod 138 to a toothed rod 139 and a pinion 140. The disengageable clutch 92, which is formed by two friction discs 141 and 142, is disengaged during the fast resetting of pickup 8*a* by means of bell crank levers 143 and 144. These levers are connected with a sensor element 213 via a rod 145, and pivoting of the levers raises a disc 147 which together with pinion 140, friction disc 141 and a pulley drum 146 forms a separate component.

In a more general manner, the control disc 17, which includes the part 17′ driven by pinion 121 from motor 122 and the separable part 17″, is provided with a plurality of control cams 101 to 116. The sensor elements 201 to 216 which engage in these control cams in order to actuate the various functions in the playback device are each associated with a respective one of these control cams, this association being designated by the correspondence of the last two digits in these two series of reference numerals.

The various sensor elements 201 to 216 may engage in the control cams, as in the case of cams 101 to 104, or contact the control cams, as for cams 105 to 116. The transmission of force between control cams and sensor elements is effected by direct mechanical contact — in both directions for control cams 101 to 104 into which the sensor elements engage — or in one direction for control cams 105 to 116 which the respective sensor elements merely contact. The respective return movement of the latter sensor elements is effected by spring forces.

As an aid to understanding, the functions of the individual control cams and sensor elements are listed below in the form of a table, the operational sequence of the playback device as a whole having already been described in connection with FIG. 1.

| Control cam | sensor element | function (actuation) |
|---|---|---|
| 101 | 201 | pushers 43 and 44 |
| 102 | 202 | contact part 16 |
| 103 | 203 | blade part 18 |
| 104 | 204 | movable (second) contact ledge 37 |
| 105 | 205 | roller 118 |
| 106 | 206 | holding finger 123 |
| 107 | 207 | braking roller 124 |
| 108 | 208 | lifting mechanism for positioning member 5 via lever 132 and rod 133 |
| 109 | 209 | raising of carriage 8 with pickup 8a |
| 110 | 210 | releasing of latch for key 73 (described below) |
| 111 | 211 | abutment hook 136 |
| 112 | 212 | resetting of carriage 8 with pickup 8a |
| 113 | 213 | release of clutch 92 |
| 114 | 214 | microswitch 148 as interrupter of drive for control disc |
| 115 | 215 | microswitch 149 as actuator for motor 26′ to drive belt 24 |
| 116 | 216 | microswitch 150 as reversing switch for motor 26′ |

The microswitch 148 which is actuated by control cam 114 serves as interrupter for the drive of control disc 17 in its starting position in a known manner such that its rest contact, which is open in the starting position, is briefly bridged in order to initiate the changing process when it receives an end signal from the record carrier. Even after termination of the end signal, control cam 17 will return to the starting position so that a complete program sequence is always performed.

Actuation of key 73 additionally permits stopping of the disconnectable part 17″ of control disc 17, if the latter is in the starting position — as described in connection with FIG. 6. However, the locking mechanism for key 73 is different from that shown in FIG. 6.

The function of rotatably mounted lever 75′ in FIG. 7 corresponds to that of the corresponding lever 75 in FIG. 6. Instead of latch 78 of FIG. 6, an angled end 151 of the rotatably mounted lever 75′ itself engages behind a blocking tongue 152 of a one-armed lever 153, which itself is in communication with key 73.

Pressure on key 73 brings the end 151 behind blocking tongue 152 so that key 73 is arrested. At the same time, as already described in connection with FIG. 6, the connection between control disc parts 17′ and 17″ is released by the depression of resiliently mounted follower pin 57. After one revolution of control disc 17, key 73 is released by contact of a suitably located raised portion of control cam 110 with sensor element 210 and control disc parts 17′ and 17″ are again in their starting position.

The driven part 17′ combines the controls for all of those functions which relate to raising and lowering the pickup and retracting the pickup to a point adjacent the outer periphery of a record. These include: raising of carriage 8 with pickup 8*a* by elements 109/209; and retracting carriage and pickup 8*a* by elements 112/212 with releasing of clutch 92 by elements 113/213. Furthermore, those functions are influenced which relate to the driving of control disc 17 itself, i.e. the releasing of the lock on key 73 under control of elements 110/210 and operation of microswitch 148 as an interrupter for the control disc drive motor 122 under control of elements 114/214, and which effect the performance of a complete function cycle.

On the disconnectable control disc 17″ there are disposed those control cams which are required to actuate the record changing functions, these being: control cams/sensor elements 101/201; 102/202; 103/203; 104/204; 105/205; 107/207; 108/208; 111/211; 115/215 and 116/216, having the functions set forth in the above table.

If actuation of key 73 causes the disconnectable part 17″ of control disc 17 to be stopped, during the next single revolution of the disc only those functions are actuated which relate to the retracting of pickup 8*a*, for example returning it to engagement with the beginning of the record which has just been played. A change of records does not take place. In this way it is possible to repeat at will already played portions of the recording. If during actuation of key 73, the control disc drive, i.e. motor 122 is also actuated by bridging microswitch 148, it is possible to initiate a repetition of the playback at any point in time. This is initiated by depressing key 73 without any further manual operation.

While FIG. 1 illustrates the cams 101–116 in only a general manner, it will be appreciated that these will be constructed to present the control paths required for performing their assigned operations in the desired sequence, the principles and techniques underlying their design being well-known in the art.

As has already been asserted herein; the invention to which the present application is directed relates to a novel program control disc exemplified by the embodiment illustrated in FIGS. 6 and 7 hereof. While the present specification and drawing also disclose an embodiment of a complete apparatus for controlling record changer operation in response to rotation of the disc, the record changing apparatus shown in FIGS. 1–5 and 7 is disclosed only in order to provide a full understanding of the manner in which the program control disc controls the operation of a complete playback device. The record changing apparatus disclosed herein is not part of the present invention and was not invented by the present joint applicants, but is rather the joint invention of Bruno Paul, Jurgen Wilisch, Gunter Wimmer and Volker Richter and was communicated by those individuals to the present joint applicants.

It will be understood that the above description of the present invention is susceptible to various modifications, changes and adaptations, and the same are intended to be comprehended within the meaning and range of equivalents of the appended claims.

We claim:

1. A program control disc for controlling the operation of a record player having an automatic record changer and means for driving the disc, said disc being provided with a plurality of function control members each arranged to control a respective function of the record player and its associated changer, and said disc comprising: a first part carrying a first group of said control members and arranged to be directly driven by the driving means; and a second part carrying a group of said control members; and coupling means arranged to connect said second part to the driving means in a selectively disconnectable manner, whereby said second part can be stopped while said first part is driven when the functions controlled by said second part are to be suppressed.

2. Program control disc for a record player as defined in claim 1 wherein said coupling means comprises a follower pin mounted for releasably connecting said first and second parts in a driving manner.

3. Program control disc for a record player as defined in claim 2 wherein said first part is provided with a recess and said follower pin is mounted to move into said recess to disconnect said second part from said first part, and said coupling means further comprises an actuating pin disposed for moving said follower pin into said recess.

4. Program control disc for a record player as defined in claim 3 wherein said second part is provided with a recess in which said actuating pin engages when it acts on said follower pin, which engagement blocks movement of said second part.

5. Program control disc for a record player as defined in claim 4 wherein the recess in said second part is a through bore therein.

6. Program control disc for a record player as defined in claim 1 wherein said first group of control members controls the functions required for resetting the record player pickup, and said second group of control members controls those functions which relate to the changing of records.

* * * * *